(12) United States Patent
Adams et al.

(10) Patent No.: US 11,614,036 B2
(45) Date of Patent: Mar. 28, 2023

(54) TURBINE SECTION OF GAS TURBINE ENGINE

(71) Applicant: RAYTHEON TECHNOLOGIES CORPORATION, Farmington, CT (US)

(72) Inventors: Paul R. Adams, Glastonbury, CT (US); Shankar S. Magge, South Windsor, CT (US); Joseph B. Staubach, Colchester, CT (US); Wesley K. Lord, South Glastonbury, CT (US); Frederick M. Schwarz, Glastonbury, CT (US); Gabriel L. Suciu, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/530,544

(22) Filed: Nov. 19, 2021

(65) Prior Publication Data
US 2022/0074352 A1 Mar. 10, 2022

Related U.S. Application Data

(63) Continuation of application No. 17/062,756, filed on Oct. 5, 2020, now Pat. No. 11,215,123, which is a
(Continued)

(51) Int. Cl.
*F02C 7/36* (2006.01)
*F02C 3/107* (2006.01)
(Continued)

(52) U.S. Cl.
CPC .................. *F02C 7/36* (2013.01); *F01D 5/06* (2013.01); *F01D 11/122* (2013.01); *F01D 25/24* (2013.01);
(Continued)

(58) Field of Classification Search
CPC . F02K 3/06; F02K 3/072; F02K 3/068; F02K 3/04; F02C 3/107; F02C 3/04; F02C 7/36
See application file for complete search history.

(56) References Cited

U.S. PATENT DOCUMENTS

| 2,258,792 A | 10/1941 | New |
| 2,936,655 A | 5/1960 | Peterson et al. |

(Continued)

FOREIGN PATENT DOCUMENTS

| EP | 0791383 A1 | 8/1997 |
| EP | 1142850 A1 | 10/2001 |

(Continued)

OTHER PUBLICATIONS

Summons to Attend Oral Proceedings in European Patent Application No. 19184027.1 dated Dec. 20, 2021.
(Continued)

*Primary Examiner* — Craig Kim
(74) *Attorney, Agent, or Firm* — Carlson, Gaskey & Olds, P.C.

(57) ABSTRACT

A gas turbine engine according to an example of the present disclosure includes, among other things, a propulsor including a circumferential array of blades, a low pressure compressor section including a low pressure compressor section inlet with a low pressure compressor section inlet annulus area and a low pressure turbine section. The low pressure turbine section includes a maximum gas path radius, the blades include a maximum radius, and a ratio of the maximum gas path radius to the maximum radius of the blades is equal to or greater than 0.35, and is less than 0.55.

30 Claims, 4 Drawing Sheets

Related U.S. Application Data continuation of application No. 16/025,094, filed on Jul. 2, 2018, now Pat. No. 10,794,293, which is a continuation of application No. 15/292,472, filed on Oct. 13, 2016, now Pat. No. 10,060,357, which is a continuation of application No. 14/793,785, filed on Jul. 8, 2015, now abandoned, which is a continuation-in-part of application No. 14/692,090, filed on Apr. 21, 2015, now Pat. No. 10,662,880, which is a continuation of application No. 13/599,175, filed on Aug. 30, 2012, now Pat. No. 9,010,085, which is a continuation of application No. 13/475,252, filed on May 18, 2012, now Pat. No. 8,844,265, which is a continuation-in-part of application No. 11/832,107, filed on Aug. 1, 2007, now Pat. No. 8,256,707.

(60) Provisional application No. 61/593,190, filed on Jan. 31, 2012, provisional application No. 61/498,516, filed on Jun. 17, 2011.

(51) Int. Cl.
  *F02C 9/18* (2006.01)
  *F02K 3/06* (2006.01)
  *F02K 3/075* (2006.01)
  *F01D 5/06* (2006.01)
  *F01D 25/24* (2006.01)
  *F02C 3/04* (2006.01)
  *F02C 7/20* (2006.01)
  *F04D 19/02* (2006.01)
  *F01D 11/12* (2006.01)

(52) U.S. Cl.
  CPC .............. *F02C 3/04* (2013.01); *F02C 3/107* (2013.01); *F02C 7/20* (2013.01); *F02C 9/18* (2013.01); *F02K 3/06* (2013.01); *F02K 3/075* (2013.01); *F04D 19/02* (2013.01); *F05B 2250/283* (2013.01); *F05D 2220/32* (2013.01); *F05D 2220/323* (2013.01); *F05D 2240/35* (2013.01); *F05D 2240/60* (2013.01); *F05D 2260/40311* (2013.01)

(56) References Cited

U.S. PATENT DOCUMENTS

| | | |
|---|---|---|
| 3,021,731 A | 2/1962 | Stoeckicht |
| 3,194,487 A | 7/1965 | Tyler et al. |
| 3,287,906 A | 11/1966 | McCormick |
| 3,327,971 A | 6/1967 | Alexander et al. |
| 3,352,178 A | 11/1967 | Lindgren et al. |
| 3,412,560 A | 11/1968 | Gaubatz |
| 3,664,612 A | 5/1972 | Skidmore et al. |
| 3,747,343 A | 7/1973 | Rosen |
| 3,754,484 A | 8/1973 | Roberts |
| 3,756,623 A | 9/1973 | Whittler |
| 3,765,623 A | 10/1973 | Donelson et al. |
| 3,814,549 A | 6/1974 | Cronstedt |
| 3,820,719 A | 6/1974 | Clark et al. |
| 3,843,277 A | 10/1974 | Ehrich |
| 3,892,358 A | 7/1975 | Gisslen |
| 3,932,058 A | 1/1976 | Harner et al. |
| 3,935,558 A | 1/1976 | Miller et al. |
| 3,988,889 A | 11/1976 | Chamay et al. |
| 4,037,809 A | 7/1977 | Legrand |
| 4,044,973 A | 8/1977 | Moorehead |
| 4,130,872 A | 12/1978 | Haloff |
| 4,220,171 A | 9/1980 | Ruehr et al. |
| 4,240,250 A | 12/1980 | Harris |
| 4,266,741 A | 5/1981 | Murphy |
| 4,284,174 A | 8/1981 | Salvana et al. |
| 4,289,360 A | 9/1981 | Zirin |
| 4,313,711 A | 2/1982 | Lee |
| 4,478,551 A | 10/1984 | Honeycutt, Jr. et al. |
| 4,595,340 A | 6/1986 | Klassen et al. |
| 4,649,114 A | 3/1987 | Miltenburger et al. |
| 4,696,156 A | 9/1987 | Burr et al. |
| 4,722,357 A | 2/1988 | Wynosky |
| 4,790,133 A * | 12/1988 | Stuart ............... F02K 3/072 416/129 |
| 4,827,712 A | 5/1989 | Coplin |
| 4,966,338 A | 10/1990 | Gordon |
| 4,969,325 A | 11/1990 | Adamson et al. |
| 4,979,362 A | 12/1990 | Vershure, Jr. |
| 5,058,617 A | 10/1991 | Stockman et al. |
| 5,102,379 A | 4/1992 | Pagluica et al. |
| 5,136,839 A | 8/1992 | Armstrong |
| 5,141,400 A | 8/1992 | Murphy et al. |
| 5,174,525 A | 12/1992 | Schilling |
| 5,273,393 A | 12/1993 | Jones et al. |
| 5,275,357 A | 1/1994 | Seelen et al. |
| 5,277,382 A | 1/1994 | Seelen et al. |
| 5,317,877 A | 6/1994 | Stuart |
| 5,320,307 A | 6/1994 | Spofford et al. |
| 5,361,580 A | 11/1994 | Ciokajlo et al. |
| 5,372,338 A | 12/1994 | Carlin et al. |
| 5,409,184 A | 4/1995 | Udall et al. |
| 5,433,674 A | 7/1995 | Sheridan et al. |
| 5,443,229 A | 8/1995 | O'Brien et al. |
| 5,447,411 A | 9/1995 | Curley et al. |
| 5,452,575 A | 9/1995 | Freid |
| 5,466,198 A | 11/1995 | McKibbin et al. |
| 5,474,258 A | 12/1995 | Taylor et al. |
| 5,497,961 A | 3/1996 | Newton |
| 5,524,847 A | 6/1996 | Brodell et al. |
| 5,634,767 A | 6/1997 | Dawson |
| 5,677,060 A | 10/1997 | Terentieva et al. |
| 5,746,391 A | 5/1998 | Rodgers et al. |
| 5,778,659 A | 7/1998 | Duesler et al. |
| 5,810,287 A | 9/1998 | O'Boyle et al. |
| 5,857,836 A | 1/1999 | Stickler et al. |
| 5,860,276 A | 1/1999 | Newton |
| 5,871,175 A | 2/1999 | Demouzon et al. |
| 5,871,176 A | 2/1999 | Demouzon et al. |
| 5,871,177 A | 2/1999 | Demouzon et al. |
| 5,915,917 A | 6/1999 | Eveker et al. |
| 5,921,500 A | 7/1999 | Ellis et al. |
| 5,927,644 A | 7/1999 | Ellis et al. |
| 5,975,841 A | 11/1999 | Lindemuth et al. |
| 5,985,470 A | 11/1999 | Spitsberg et al. |
| 6,106,233 A | 8/2000 | Walker et al. |
| 6,126,110 A | 10/2000 | Seaquist et al. |
| 6,138,949 A | 10/2000 | Manende et al. |
| 6,189,830 B1 | 2/2001 | Schnelz et al. |
| 6,223,616 B1 | 5/2001 | Sheridan |
| 6,315,815 B1 | 11/2001 | Spadaccini et al. |
| 6,318,070 B1 | 11/2001 | Rey et al. |
| 6,387,456 B1 | 5/2002 | Eaton, Jr. et al. |
| 6,474,597 B1 | 11/2002 | Cazenave |
| 6,478,545 B2 | 11/2002 | Crall et al. |
| 6,517,027 B1 | 2/2003 | Abruzzese |
| 6,517,341 B1 | 2/2003 | Brun et al. |
| 6,524,072 B1 | 2/2003 | Brownell et al. |
| 6,607,165 B1 | 8/2003 | Manteiga et al. |
| 6,619,030 B1 | 9/2003 | Seda et al. |
| 6,652,222 B1 | 11/2003 | Wojtyczka et al. |
| 6,708,925 B2 | 3/2004 | Udall |
| 6,709,492 B1 | 3/2004 | Spadaccini et al. |
| 6,814,541 B2 | 11/2004 | Evans et al. |
| 6,883,303 B1 | 4/2005 | Seda |
| 6,899,518 B2 | 5/2005 | Lucas et al. |
| 6,935,591 B2 | 8/2005 | Udall |
| 7,021,042 B2 | 4/2006 | Law |
| 7,021,585 B2 | 4/2006 | Loewenstein et al. |
| 7,055,330 B2 | 6/2006 | Miller |
| 7,134,286 B2 | 11/2006 | Markarian et al. |
| 7,219,490 B2 | 5/2007 | Dev |
| 7,328,580 B2 | 2/2008 | Lee et al. |
| 7,374,403 B2 | 5/2008 | Decker et al. |
| 7,445,433 B2 | 11/2008 | Chivers et al. |
| 7,591,754 B2 | 9/2009 | Duong et al. |
| 7,632,064 B2 | 12/2009 | Somanath et al. |

(56) References Cited

U.S. PATENT DOCUMENTS

| | | | |
|---|---|---|---|
| 7,654,075 B2 | 2/2010 | Udall | |
| 7,662,059 B2 | 2/2010 | McCune | |
| 7,677,493 B2 | 3/2010 | Diochon et al. | |
| 7,694,505 B2 | 4/2010 | Schilling | |
| 7,806,651 B2 | 10/2010 | Kennepohl et al. | |
| 7,824,305 B2 | 11/2010 | Duong et al. | |
| 7,828,682 B2 | 11/2010 | Smook | |
| 7,841,165 B2* | 11/2010 | Orlando | F02K 3/072 60/268 |
| 7,926,260 B2 | 4/2011 | Sheridan et al. | |
| 7,997,868 B1 | 8/2011 | Liang | |
| 8,205,432 B2 | 6/2012 | Sheridan | |
| 8,545,167 B2 | 10/2013 | Cheung | |
| 8,834,099 B1 | 9/2014 | Topol et al. | |
| 8,844,265 B2* | 9/2014 | Adams | F01D 9/041 60/226.3 |
| 8,869,504 B1 | 10/2014 | Schwarz et al. | |
| 10,473,112 B2* | 11/2019 | Smith | F01D 5/26 |
| 10,502,066 B2* | 12/2019 | Lewis | F01D 11/08 |
| 10,577,937 B2* | 3/2020 | Wilson | F01D 5/16 |
| 10,584,632 B1* | 3/2020 | Kannangara | F02C 3/06 |
| 10,598,022 B1* | 3/2020 | Kannangara | F01D 25/162 |
| 10,612,471 B1* | 4/2020 | Bousfield | F01D 25/02 |
| 10,670,040 B2* | 6/2020 | Nolcheff | B64D 33/02 |
| 10,683,806 B2* | 6/2020 | Moniz | F02K 3/06 |
| 10,724,541 B2* | 7/2020 | Qiu | B64D 33/02 |
| 10,760,530 B2* | 9/2020 | Stretton | F02C 3/04 |
| 10,815,881 B2* | 10/2020 | Clements | F02C 7/36 |
| 11,149,650 B2 | 10/2021 | Adams et al. | |
| 11,156,167 B2* | 10/2021 | Stretton | F02C 7/36 |
| 11,242,805 B2* | 2/2022 | Adams | F02K 3/075 |
| 11,268,450 B2* | 3/2022 | Lemarchand | F01D 7/00 |
| 11,286,779 B2* | 3/2022 | Nolcheff | F01D 5/141 |
| 11,346,289 B2* | 5/2022 | Adams | F02K 3/075 |
| 11,480,108 B2* | 10/2022 | Adams | F02C 7/36 |
| 2001/0010798 A1 | 8/2001 | Dailey et al. | |
| 2002/0172593 A1 | 11/2002 | Udall | |
| 2003/0163984 A1 | 9/2003 | Seda et al. | |
| 2006/0090448 A1 | 5/2006 | Henry | |
| 2006/0228206 A1 | 10/2006 | Decker et al. | |
| 2006/0233641 A1 | 10/2006 | Lee et al. | |
| 2006/0248900 A1 | 11/2006 | Suciu et al. | |
| 2007/0214795 A1* | 9/2007 | Cooker | F02C 9/28 60/39.24 |
| 2008/0003096 A1 | 1/2008 | Kohli et al. | |
| 2008/0098718 A1 | 5/2008 | Henry et al. | |
| 2008/0116009 A1 | 5/2008 | Sheridan et al. | |
| 2008/0317588 A1 | 12/2008 | Grabowski et al. | |
| 2009/0056343 A1 | 3/2009 | Suciu et al. | |
| 2009/0092487 A1 | 4/2009 | McCune et al. | |
| 2009/0185908 A1 | 7/2009 | Chung et al. | |
| 2009/0304473 A1 | 12/2009 | Holze et al. | |
| 2009/0304518 A1 | 12/2009 | Kodama et al. | |
| 2009/0314881 A1 | 12/2009 | Suciu et al. | |
| 2010/0105516 A1 | 4/2010 | Sheridan et al. | |
| 2010/0148396 A1 | 6/2010 | Xie et al. | |
| 2010/0212281 A1 | 8/2010 | Sheridan | |
| 2010/0218483 A1 | 9/2010 | Smith | |
| 2010/0259013 A1 | 10/2010 | Schreiber | |
| 2010/0331139 A1 | 12/2010 | McCune | |
| 2011/0056183 A1 | 3/2011 | Sankrithi et al. | |
| 2011/0123326 A1 | 5/2011 | DiBenedetto et al. | |
| 2011/0159797 A1 | 6/2011 | Beltman et al. | |
| 2011/0293423 A1 | 12/2011 | Bunker et al. | |
| 2011/0302907 A1 | 12/2011 | Murphy | |
| 2012/0124964 A1 | 5/2012 | Hasel et al. | |
| 2012/0251306 A1 | 10/2012 | Reinhardt et al. | |
| 2012/0291449 A1 | 11/2012 | Adams et al. | |
| 2013/0186058 A1 | 7/2013 | Sheridan et al. | |
| 2013/0224003 A1 | 8/2013 | Kupratis et al. | |
| 2013/0255219 A1 | 10/2013 | Schwarz et al. | |
| 2014/0174056 A1 | 6/2014 | Suciu et al. | |
| 2015/0089958 A1 | 4/2015 | Suciu et al. | |
| 2015/0233303 A1 | 8/2015 | Sheridan et al. | |
| 2015/0377122 A1 | 12/2015 | Adams et al. | |
| 2019/0017445 A1 | 1/2019 | Adams et al. | |
| 2020/0408152 A1 | 12/2020 | Kappmeyer et al. | |
| 2022/0112817 A1 | 4/2022 | Bradbrook et al. | |

FOREIGN PATENT DOCUMENTS

| | | |
|---|---|---|
| EP | 1617044 A1 | 1/2006 |
| EP | 2025898 A2 | 2/2009 |
| EP | 2359975 A1 | 8/2011 |
| EP | 2535548 A2 | 12/2012 |
| EP | 3115576 A1 | 1/2017 |
| GB | 1516041 A | 6/1978 |
| GB | 2010969 A | 7/1979 |
| GB | 2041090 A | 9/1980 |
| GB | 2426792 A | 12/2006 |
| GB | 2440345 A | 1/2008 |
| WO | 2007038674 A1 | 4/2007 |
| WO | 2014152101 A1 | 9/2014 |

OTHER PUBLICATIONS

Greitzer, E.M., Bonnefoy, P.A., Delaroseblanco,E., Dorbian, C.S., Drela, M., Hall, D.K., Hansman, R.J., Hileman, J.I., Liebeck, R.H., Levegren, J. (2010). N+3 aircraft concept designs and trade studies, final report. vol. 1. Dec. 1, 2010. NASA/CR-2010-216794/vol. 1. pp. 1-187.

Griffiths, B. (2005). Composite fan blade containment case. Modem Machine Shop. Retrieved from: http://www.mmsonline.com/articles/composite-fan-blade-containment-case pp. 1-4.

Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.

Groweneweg, J.F. (1994). Fan noise research at NASA. Noise-CON 94. Fort Lauderdale, FL. May 1-4, 1994. pp. 1-10.

Gunston, B. (Ed.) (2000). Jane's aero-engines, Issue seven. Coulsdon, Surrey, UK: Jane's Information Group Limited. pp. 510-512.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.

Guynn, M.D., et al., "Analysis of turbofan design options for an advanced single-aisle transport aircraft", American Institute of Aeronautics and Astronautics, 2009, pp. 1-13.

Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.

Haldenbrand, R. and Norgren, W.M. (1979). Airesearch QCGAT program [quiet clean general aviation turbofan engines]. NASA-CR-159758. pp. 1-199.

Hall, C.A. and Crichton, D. (2007). Engine design studies for a silent aircraft. Journal of Turbomachinery, 129, 479-487.

Han, J., Dutta, S., and Ekkad, S.V. (2000). Gas turbine heat transfer and cooling technology. New York, NY: Taylor & Francis. pp. 1-25, 129-157, and 160-249.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Hazlett, R.N. (1991). Thermal oxidation stability of aviation turbine fuels. Philadelphia, PA: ASTM. pp. 1-163.

Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.

Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.

Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.

(56) References Cited

OTHER PUBLICATIONS

Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.

Hendricks, E.S. and Tong, M.T. (2012). Performance and weight estimates for an advanced open rotor engine. NASA/TM-2012-217710. pp. 1-13.

Hess, C. (1998). Pratt & Whitney develops geared turbofan. Flug Revue 43(7). Oct. 1998.

Hill, P.G., Peterson, C.R. (1965). Mechanics and thermodynamics of propulsion. Addison-Wesley Publishing Company, Inc. pp. 307-308.

Hill, P.G., Peterson, C.R. (1992). Mechanics and thermodynamics of propulsion, 2nd Edition. Addison-Wesley Publishing Company, Inc. pp. 400-406.

Holcombe, V. (2003). Aero-Propulsion Technology (APT) task V low noise ADP engine definition study. NASA CR-2003-212521. Oct. 1, 2003. pp. 1-73.

Honeywell Learjet 31 and 35/36 TFE731-2 to 2C Engine Upgrade Program. Sep. 2005. pp. 1-4.

Honeywell LF502. Jane's Aero-engines, Aero-engines—Turbofan. Feb. 9, 2012.

Honeywell LF502. Jane's Aero-engines, Aero-engines—Turbofan. Aug. 17, 2016.

Honeywell LF507. Jane's Aero-engines, Aero-engines—Turbofan. Feb. 9, 2012.

Honeywell Sabreliner 65 TFE731-3 to -3D Engine Upgrade Program. Oct. 2005. pp. 1-4.

Honeywell TFE731. Jane's Aero-engines, Aero-engines—Turbofan. Jul. 18, 2012.

Honeywell TFE731 Pilot Tips. pp. 1-143.

Honeywell TFE731-5AR to -5BR Engine Conversion Program. Sep. 2005. pp. 1-4.

Horikoshi, S. and Serpone, N. (2013). Introduction to nanoparticles. Microwaves in nanoparticle synthesis. Wiley-VCH Verlag GmbH & Co. KGaA. pp. 1-24.

Howard, D.F. (1976). QCSEE preliminary under the wing flight propulsion system analysis report. NASA CR-134868. Feb. 1, 1976. pp. 1-260.

Howe, D.C. and Wynosky, T.A. (1985). Energy efficient engine program advanced turbofan nacelle definition study. NASA CR-174942. May 1, 1985. pp. 174.

Howe, D.C., and Wynosky, T.A. (1985). Energy efficient engine program advanced turbofan nacelle definition study. NASA-CR-174942. May 1985. pp. 1-60.

Howe, D.C., and Wynosky, T.A. (1985). Energy efficient engine program advanced turbofan nacelle definition study. NASA-CR-174942. May 1985. University of Washington dated Dec. 13, 1990. pp. 1-14.

Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.

Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.

Hughes, C. (2010). Geared turbofan technology. NASA Environmentally Responsible Aviation Project. Green Aviation Summit. NASA Ames Research Center. Sep. 8-9, 2010. pp. 1-8.

Ivchenko-Progress AI-727M. Jane's Aero-engines, Aero-engines—Turbofan. Nov. 27, 2011.

Ivchenko-Progress D-27, "Jane's Aero-Engines", Jane's by IHS Markit, Feb. 7, 2007, 2 pages.

Ivchenko-Progress D-436. Jane's Aero-engines, Aero-engines—Turbofan. Feb. 8, 2012.

Ivchenko-Progress D-727. Jane's Aero-engines, Aero-engines—Turbofan. Feb. 7, 2007.

Jacobson, N.S. (1993). Corrosion of silicon-based ceramics in combustion environments. J. Am. Ceram. Soc. 76(1). pp. 3-28.

Jeng, Y.-L., Lavernia, E.J. (1994). Processing of molybdenum disilicide. J. of Mat. Sci. vol. 29. 1994. pp. 2557-2571.

Johnston, R.P. and Hemsworth, M.C. (1978). Energy efficient engine preliminary design and integration studies. Jun. 1, 1978. pp. 1-28.

Johnston, R.P., Hirschkron, R., Koch, C.C., Neitzel, R.E., and Vinson, P.W. (1978). Energy efficient engine: Preliminary design and integration study—final report. NASA CR-135444. Sep. 1978. pp. 1-401.

Jorgensen, P.J., Wadsworth, M.E., and Cutler, I.B. (1961). Effects of water vapor on oxidation of silicon carbide. J. Am. Ceram. Soc. 44(6). pp. 248-261.

Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.

Kandebo, S.W. (1998). Geared-Turbofan engine design targets cost, complexity. Aviation Week & Space Technology, 148(8). p. 34-5.

Kandebo, S.W. (1998). Pratt & Whitney launches geared turbofan engine. Aviation Week & Space Technology, 148 (8). p. 32-4.

Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.

Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.

Kerrebrock, J.L. (1977). Aircraft engines and gas turbines. Cambridge, MA: The MIT Press. p. 11.

Knip, Jr., G. (1987). Analysis of an advanced technology subsonic turbofan incorporating revolutionary materials. NASA Technical Memorandum. May 1987. pp. 1-23.

Koff, B.L. (2003). Gas turbine technology evolution—A designer's perspective. AIAA/ICAS International Air and Space Symposium and Exposition. Jul. 14-16, 2003. AIAA 2003-2722. pp. 1-15.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Krantz, T.L. (1990). Experimental and analytical evaluation of efficiency of helicopter planetary stage. NASA Technical Paper. Nov. 1990. pp. 1-19.

Krenkel, W., Naslain, R., and Schneider, H. Eds. (2001). High temperature ceramic matrix composites pp. 224-229. Weinheim, DE: Wiley-VCH Verlag GmbH.

Kurzke, J. (2001). GasTurb 9: A program to calculate design and off-design performance of gas turbines. Retrieved from: https://www.scribd.com/document/92384867/GasTurb9Manual.

Kurzke, J. (2012). GasTurb 12: Design and off-design performance of gas turbines. Retrieved from: https://www.scribd.com/document/153900429/GasTurb-12.

Kurzke, J. (2008). Preliminary Design, Aero-engine design: From state of the art turbofans towards innovative architectures. pp. 1-72.

Kurzke, J. (2009). Fundamental differences between conventional and geared turbofans. Proceedings of ASME Turbo Expo: Power for Land, Sea, and Air. 2009, Orlando, Florida. pp. 145-153.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Lau, K., Gu, C., and Hui, D. (2005). A critical review on nanotube and nanotube/nanoclay related polymer composite materials. Composites: Part B 37(2006) 425-436.

Leckie, F.A. and Dal Bello, D.J. (2009). Strength and stiffness of engineering systems. Mechanical Engineering Series. Springer. pp. 1-10, 48-51.

Leckie F.A., et al., "Strength and Stiffness of Engineering Systems," Mechanical Engineering Series, Springer, 2009, pp. 1-3.

Lee, K.N. (2000). Current status of environmental barrier coatings for Si-Based ceramics. Surface and Coatings Technology 133-134, 2000. pp. 1-7.

(56) References Cited

OTHER PUBLICATIONS

Levintan, R.M. (1975). Q-Fan demonstrator engine. Journal of Aircraft. vol. 12( 8). Aug. 1975. pp. 658-663.

Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.

Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp. 1-187.

Litt, J.S. (2018). Sixth NASA Glenn Research Center propulsion control and diagnostics (PCD) workshop. NASA/CP-2018-219891. Apr. 1, 2018. pp. 1-403.

Lord, W.K., Macmartin, D.G., and Tillman, T.G. (2000). Flow control opportunities in gas turbine engines. American Institute of Aeronautics and Astronautics. pp. 1-15.

Lynwander, P. (1983). Gear drive systems: Design and application. New York, New York: Marcel Dekker, Inc. pp. 145, 355-358.

Macisaac, B. and Langston, R. (2011). Gas turbine propulsion systems. Chichester, West Sussex: John Wiley & Sons, Ltd. pp. 260-265.

Mancuso, J.R. and Corcoran, J.P. (2003). What are the differences in high performance flexible couplings for turbomachinery? Proceedings of the Thirty-Second Turbomachinery Symposium. 2003. pp. 189-207.

Manual. Student's Guide to Learning SolidWorks Software. Dassault Systemes—SolidWorks Corporation. pp. 1-156.

Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.

Mattingly, J.D. (1996). Elements of gas turbine propulsion. New York, New York: McGraw-Hill, Inc. pp. 1-18, 60-62, 223-234, 462-479, 517-520, 757-767, and 862-864.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 673-675, 682-685, 697-699, 703-705, 802-805, 862-864, and 923-925.

Mattingly, J.D. (1996). Elements of gas turbine propulsion. New York, New York: McGraw-Hill, Inc. pp. 8-15.

Mavris, D.N., Schutte, J.S. (2016). Application of deterministic and probabilistic system design methods and enhancements of conceptual design tools for ERA project final report. NASA/CR-2016-219201. May 1, 2016. pp. 1-240.

Mcardle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.

Mccracken, R.C. (1979). Quiet short-haul research aircraft familiarization document. NASA-TM-81149. Nov. 1, 1979. pp. 1-76.

Mccune, M.E. (1993). Initial test results of 40,000 horsepower fan drive gear system for advanced ducted propulsion systems. AIAA 29th Joint Conference and Exhibit. Jun. 28-30, 1993. pp. 1-10.

Mcmillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Meier N., "Civil Turbojet/Turbofan Specifications", 2005, retrieved from http://jet-engine.net/civtfspec.html, 8 pages.

Merriam-Webster's collegiate dictionary, 10th Ed. (2001). p. 1125-1126.

Merriam-Webster's collegiate dictionary, 11th Ed. (2009). p. 824.

Meyer, A.G. (1988). Transmission development of TEXTRON Lycoming's geared fan engine. Technical Paper. Oct. 1988. pp. 1-12.

Middleton, P. (1971). 614: VFW's jet feederliner. Flight International, Nov. 4, 1971. p. 725, 729-732.

Misel, O.W. (1977). QCSEE main reduction gears test program. NASA CR-134669. Mar. 1, 1977. pp. 1-222.

Moxon, J. How to save fuel in tomorrow's engines. Flight International. Jul. 30, 1983. 3873(124). pp. 272-273.

Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Munt, R. (1981). Aircraft technology assessment: Progress in low emissions engine. Technical Report. May 1981. pp. 1-171.

Nanocor Technical Data for Epoxy Nanocomposites using Nanomer 1.30E Nanoclay. Nnacor, Inc. Oct. 2004.

NASA Conference Publication. (1978). CTOL transport technology. NASA-CP-2036-PT-1. Jun. 1, 1978. pp. 1-531.

NASA Conference Publication. Quiet, powered-lift propulsion. Cleveland, Ohio. Nov. 14-15, 1978. pp. 1-420.

Neitzel, R., Lee, R., and Chamay, A.J. (1973). Engine and installation preliminary design. Jun. 1, 1973. pp. 1-333.

Neitzel, R.E., Hirschkron, R. and Johnston, R.P. (1976). Study of unconventional aircraft engines designed for low energy consumption. NASA-CR-135136. Dec. 1, 1976. pp. 1-153.

Newsletter. PurePower PW1000G Engine News. vol. 3(3). Dec. 2010.

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 2986. pp. 1-101.

Norton, M. and Karczub, D. (2003). Fundamentals of noise and vibration analysis for engineers. Press Syndicate of the University of Cambridge. New York: New York. p. 524.

Notice of Allowance and allowed claims for U.S. Appl. No. 13/475,252 dated May 27, 2014.

Notice of Allowance and allowed claims for U.S. Appl. No. 14/102,764 dated May 30, 2014.

Notice of Allowance for U.S. Appl. No. 13/599,175 dated Jun. 26, 2014 and allowed claims.

Notice of Opposition for European Patent No. 2535548 (13813216. 2) mailed Apr. 29, 2019 by Safran Aircraft Engines.

Oates, G.C. (Ed). (1989). Aircraft propulsion systems and technology and design. Washington, D.C.: American Institute of Aeronautics, Inc. pp. 341-344.

Office Action for U.S. Appl. No. 14/102,764 dated Feb. 21, 2014.

Orbit Search Results, "bypass area ratio". Retrieved Feb. 21, 2019.

Parametric study of STOL short-haul transport engine cycles and operational techniques to minimize community noise impact. NASA-CR-114759. Jun. 1, 1974. pp. 1-398.

Parker, R.G. and Lin, J. (2001). Modeling, modal properties, and mesh stiffness variation instabilities of planetary gears. Prepared for NASA. NASA/CR-2001-210939. May 2001. pp. 1-111.

Petition for Inter Partes Review of U.S. Pat. No. 8,844,265, *General Electric Company*, Petitioner, v. *United Technologies Corporation*, Patent Owner: IPR2016-01287, Filed Jun. 28, 2016.

Petition for Inter Partes Review of U.S. Pat. No. 9,709,070. *General Electric Company*, Petitioner, v. *United Technologies Corporation*, Patent Owner IPR2020-00083. Oct. 23, 2019.

Petition for Inter Partes Review of U.S. Pat. No. 9,920,653, *General Electric Company*, Petitioner, v. *United Technologies Corporation*, Patent Owner: IPR2019-01489, Aug. 12, 2019.

Petrovic, J.J., Castro, R.G., Vaidya, R.U., Peters, M.L, Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.

Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.

(56) References Cited

OTHER PUBLICATIONS geaviation.com/press-release/ge90-engine-family/ge'scomposite-fan-blade-revolution-turns-20-years-old.
Product Brochure. Garrett TFE731. Allied Signal. Copyright 1987. pp. 1-24.
Product Brochure. The ALF 502R turbofan: technology, ecology, economy. Avco Lycoming TEXTRON.
Pyrograf-III Carbon Nanofiber. Product guide. Retrieved Dec. 1, 2015 from: http://pyrografproducts.com/Merchant5/merchant.mvc?Screen=cp_nanofiber.
QCSEE ball spline pitch-change mechanism whirligig test report. (1978). NASA-CR-135354. Sep. 1, 1978. pp. 1-57.
QCSEE hamilton standard cam/harmonic drive variable pitch fan actuation system derail design report. (1976). NASA-CR-1 34852. Mar. 1, 1976. pp. 1-172.
QCSEE main reduction gears bearing development program final report. (1975). NASA-CR-134890. Dec. 1, 1975. pp. 1-41.
QCSEE over-the-wing final design report. (1977). NASA-CR-134848. Jun. 1, 1977. pp. 1-460.
QCSEE over-the-wing propulsion system test report vol. III—mechanical performance. (1978). NASA-CR-135325. Feb. 1, 1978. pp. 1-112.
QCSEE Preliminary analyses and design report. vol. 1. (1974). NASA-CR-134838. Oct. 1, 1974. pp. 1-337.
QCSEE preliminary analyses and design report. vol. II. (1974). NASA-CR-134839. Oct. 1, 1974. pp. 340-630.
QCSEE the aerodynamic and mechanical design of the QCSEE under-the-wing fan. (1977). NASA-CR-135009. Mar. 1, 1977. pp. 1-137.
QCSEE the aerodynamic and preliminary mechanical design of the QCSEE OTW fan. (1975). NASA-CR-134841. Feb. 1, 1975. pp. 1-74.
QCSEE under-the-wing engine composite fan blade design. (1975). NASA-CR-134840. May 1, 1975. pp. 1-51.
QCSEE under-the-wing engine composite fan blade final design test report. (1977). NASA-CR-135046. Feb. 1, 1977. pp. 1-55.
QCSEE under-the-wing engine composite fan blade preliminary design test report. (1975). NASA-CR-134846. Sep. 1, 1975. pp. 1-56.
QCSEE under-the-wing engine digital control system design report. (1978). NASA-CR-134920. Jan. 1, 1978. pp. 1-309.
Quiet clean general aviation turbofan (QCGAT) technology study final report vol. I. (1975). NASA-CR-164222. Dec. 1, 1975. pp. 1-186.
Ramsden, J.M. (Ed). (1978). The new European airliner. Flight International, 113(3590). Jan. 7, 1978. pp. 39-43.
Ratna, D. (2009). Handbook of thermoset resins. Shawbury, UK: iSmithers. pp. 187-216.
Rauch, D. (1972). Design study of an air pump and integral lift engine ALF-504 using the Lycoming 502 core. Prepare for NASA. Jul. 1972. pp. 1-182.
Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
Reuters. (2014). GE exec says avoided geared design in jet engine battle with Pratt. Retrieved from: https://www.reuters.com/article/us-general-electric-united-tech-engine/ge-exec-says-avoided-geared-design-in-jet-engine-battle-with-pratt-idUSKBN0HA2H620140915.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
Riegler, C., and Bichlmaier, C. (2007). The geared turbofan technology—Opportunities, challenges and readiness status. Porceedings CEAS. Sep. 10-13, 2007. Berlin, Germany, pp. 1-12.
Rolls-Royce M45H. Jane's Aero-engines, Aero-engines—Turbofan. Feb. 24, 2010.
Rolly-Royce RB211. Jane's Aero-Engines. Jane's by IHS Markit. Feb. 24, 2010.

Rotordynamic instability problems in high-performance turbomachinery. (1986). NASA conference publication 2443. Jun. 2-4, 1986.
Roux, E. (2007). Turbofan and turbojet engines database handbook. Editions Elodie Roux. Blagnac: France. pp. 1-595.
Sabnis, J. (2010). The PW1000G PurePower new engine concept and its impact on MRO. Av Week Engine MRO Forum. Dec. 1, 2010. pp. 1-45.
Salemme, C.T. and Murphy, G.C. (1979). Metal spar/superhybrid shell composite fan blades. Prepared for NASA. NASA-CR-159594. Aug. 1979. pp. 1-127.
Sargisson, D.F. (1985). Advanced propfan engine technology (APET) and single-rotation gearbox/pitch change mechanism. NASA Contractor Report-168113. R83AEB592. Jun. 1, 1985. pp. 1-476.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Schaefer, J.W., Sagerser, D.R., and Stakolich, E.G. (1977). Dynamics of high-bypass-engine thrust reversal using a variable-pitch fan. Technical Report prepared for NASA. NASA-TM-X-3524. May 1, 1977. pp. 1-33.
Schairer, E.T. (1977). Recent conceptual design studies of single turbofan engine aircraft. Society of Automotive Engineers. Business Aircraft Meeting. Mar. 29-Apr. 1, 1977. pp. 1-17, Table 1 and Figures 1-15.
Seader, J.D. and Henley, E.J. (1998). Separation process principles. New York, NY: John Wiley & Sons, Inc. pp. 722-726 and 764-771.
Shah, D.M. (1992). MoSi2 and other silicides as high temperature structural materials. Superalloys 1992. The Minerals, Metals, & Materials Society. pp. 409-422.
Shorter Oxford English Dictionary, 6th Edition. (2007), vol. 2, N-Z, pp. 1888.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Singh, A. (2005). Application of a system level model to study the planetary load sharing behavior. Jounal of Mechanical Design. vol. 127. May 2005. pp. 469-476.
Singh, B. (1986). Small engine component technology (SECT) study. NASA CR-175079. Mar. 1, 1986. pp. 1-102.
Singh, R. and Houser, D.R. (1990). Non-linear dynamic analysis of geared systems. NASA-CR-180495. Feb. 1, 1990. pp 1-263.
Smith, C.E., Hirschkron, R., and Warren, R.E. (1981). Propulsion system study for small transport aircraft technology (STAT). Final report. NASA-CR-165330. May 1, 1981. pp. 1-216.
Smith-Boyd, L. and Pike, J. (1986). Expansion of epicyclic gear dynamic analysis program. Prepared for NASA. NASA CR-179563. Aug. 1986. pp. 1-98.
Sowers, H.D. and Coward, W.E. (1978). QCSEE over-the-wing (OTW) engine acuostic design. NASA-CR-135268. Jun. 1, 1978. pp. 1-52.
Spadaccini, L.J., and Huang, H. (2002). On-line fuel deoxygenation for coke suppression. ASME, Jun. 2002. pp. 1-7.
Spadaccini, L.J., Sobel, D.R., and Huang, H. (2001). Deposit formation and mitigation in aircraft fuels. Journal of Eng. for Gas Turbine and Power, vol. 123. Oct. 2001. pp. 741-746.
Summons to Attend Oral Proceedings for EP Application No. 16178679.3 dated Sep. 17, 2019.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Sutliff, D. (2005). Rotating rake turbofan duct mode measurement system. NASA TM-2005-213828. Oct. 1, 2005. pp. 1-34.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Sweetman, B. and Sutton, O. (1998). Pratt & Whitney's surprise leap. Interavia Business & Technology, 53.621, p. 25.

(56) References Cited

OTHER PUBLICATIONS

Tapken, U., Raitor, T., and Enghardt, L. (2009). Tonal noise radiation from an UHBR fan-optimized in-duct radial mode analysis. AIAA/CEAS Aeroacoustics Conference. May 11-13, 2009. AIAA 2009-3288. pp. 1-15.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Technical Data. Teflon. WS Hampshire Inc. Retrieved from: http://catalog.wshampshire.com/Asset/psg_teflon_ptfe.pdf.
Technical Report. (1975). Quiet Clean Short-haul Experimental Engine (QCSEE) UTW fan preliminary design. NASA-CR-134842. Feb. 1, 1975. pp. 1-98.
Technical Report. (1977). Quiet Clean Short-haul Experimental Engine (QCSEE) Under-the-Wing (UTW) final design report. NASA-CR-134847. Jun. 1, 1977. pp. 1-697.
The European Search Report for EP Application No. 19184027.1, dated Nov. 25, 2019.
Third Party Observation submitted by Rolls-Royce Plc for European Patent Application No. 18184558.7 (EP3409935) dated Dec. 17, 2019.
Thulin, R.D., Howe, D.C., and Singer, I.D. (1982). Energy efficient engine: High pressure turbine detailed design report. Prepared for NASA. NASA CR-165608. pp. 1-178.
Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.
Treager, I.E. (1995). Aircraft gas turbine engine technology, 3rd Edition. GLENCOE Aviation Technology Series. McGraw-Hill. p. 445.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites 4th Int'l Conf. on High Temp. Ceramic Matrix Composites. Oct. 1-3, 2001. pp. 149-156.
Tummers, B. (2006). DataThief III. Retreived from: https://datathief.org/DatathiefManual.pdf pp. 1-52.
Turbomeca Aubisque. Jane's Aero-engines, Aero-engines—Turbofan. Nov. 2, 2009.
Turner, M. G., Norris, A., and Veres, J.P. (2004). High-fidelity three-dimensional simulation of the GE90. NASA/TM-2004-212981. pp. 1-18.
Type Certificate Data Sheet No. E6NE. Department of Transportation Federal Aviation Administration. Jun. 7, 2002. pp. 1-10.
U.S. Department of Transportation: Federal Aviation Administration Advisory Circular, Runway overrun prevention, dated: Nov. 6, 2007, p. 1-8 and Appendix 1 pp. 1-15, Appendix 2 pp. 1-6, Appendix 3 pp. 1-3, and Appendix 4 pp. 1-5.
U.S. Department of Transportation: Federal Aviation Administration Advisory Circular. Standard operating procedures for flight deck crewmembers, Dated: Feb. 27, 2003, p. 1-6 and Appendices.
U.S. Department of Transportation: Federal Aviation Administration Type Certificate Data Sheet No. E6WE. Dated: May 9, 2000. p. 1-9.
Vasudevan, A.K. and Petrovic, J.J. (1992). A comparative overview of molybedenum disilicide composites. Materials Science and Engineering, A155, 1992. pp. 1-17.

Walsh, P.P. and Fletcher, P. (2004). Gas turbine performance, 2nd Edition. Oxford, UK: Blackwell Science. pp. 1-658.
Walsh, P.P. and Fletcher, P. (2004). Gas turbine performance, 2nd Edition. Oxford, UK: Blackwell Science. pp. 186-191.
Warwick, G. (2007). Civil engines: Pratt & Whitney gears up for the future with GTF. Flight International, Nov. 2007. Retrieved Jun. 14, 2016 from: https://www.flightglobal.com/news/articles/civil-engines-pratt-amp-whitney-gears-up-for-the-future-with-219989/.
Waters, M.H. and Schairer, E.T. (1977). Analysis of turbofan propulsion system weight and dimensions. NASA Technical Memorandum. Jan. 1977. pp. 1-65.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Wendus, B.E., Stark, D.F., Holler, R.P., and Funkhouse, M.E. (2003). Follow-on technology requirement study for advanced subsonic transport. Technical Report prepared for NASA. NASA/CR-2003-212467. Aug. 1, 2003. pp. 1-47.
Whitaker, R. (1982). ALF 502: plugging the turbofan gap. Flight International, p. 237-241, Jan. 30, 1982.
Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.
Wikipedia. Stiffness. Retrieved Jun. 28, 2018 from: https://en.wikipedia.org/wiki/Stiffness.
Wikipedia. Torsion spring. Retreived Jun. 29, 2018 from: https://en.wikipedia.org/wiki/Torsion_spring.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Willis, W.S. (1979). Quiet clean short-haul experimental engine (QCSEE) final report. NASA/CR-159473 pp. 1-289.
Winn, A. (Ed). (1990). Wide Chord Fan Club. Flight International, 4217(137). May 23-29, 1990. pp. 34-38.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Xie, M. (2008). Intelligent engine systems: Smart case system. NASA/CR-2008-215233. pp. 1-31.
Xu, Y., Cheng, L., Zhang, L., Ying, H., and Zhou, W. (1999). Oxidation behavior and mechanical properties of C/SiC composites with Si-MoSi2 oxidation protection coating. J. of Mat. Sci. vol. 34. 1999. pp. 6009-6014.
Zalud, T. (1998). Gears put a new spin on turbofan performance. Machine Design, 70(20), p. 104.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Zhao, J.C. and Westbrook, J.H. (2003). Ultrahigh-temperature materials for jet engines. MRS Bulletin. vol. 28(9). Sep. 2003. pp. 622-630.
Darrah, S. (1987). Jet fuel deoxygenation. Interim Report for Period Mar. 1987-Jul. 1988. pp. 1-22.
Dassault Falcon 900EX Easy Systems Summary. Retrieved from: http://www.smartcockpit.com/docs/F900EX-Engines.pdf pp. 1-31.
Datasheet. CF6-80C2 high-bypass turbofan engines. Retreived from https://geaviation.com/sites/default/files/datasheet-CF6-80C2.pdf.
Datasheet. CFM56-5B for the Airbus A320ceo family and CFM56-7B for the Boeing 737 family. https://www.cfmaeroengines.com/.
Datasheet. Genx™ high bypass turbofan engines. Retreived from: https://www.geaviation.com/sites/default/files/datasheet-genx.pdf.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Davis, D.G.M. (1973). Variable-pitch fans: Progress in Britain. Flight International. Apr. 19, 1973. pp. 615-617.

(56) References Cited

OTHER PUBLICATIONS

Decision for Inter Partes Review of U.S. Pat. No. 8,844,265. Claims 1, 2, 6-16, and 20. *General Electric Company*, Petitioner v *United Technologies Corporation*, Patent Owner. Entered Date of Jan. 3, 2017.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Declaration of Dr. Magdy Attia, In re U.S. Pat. No. 8,313,280, Executed Oct. 21, 2016, pp. 1-88.
Declaration of Dr. Magdy Attia, In re U.S. Pat. No. 8,517,668, Executed Dec. 8, 2016, pp. 1-81.
Declaration of John Eaton, Ph.D. In re U.S. Pat. No. 8,869,568, Executed Mar. 28, 2016, pp. 1-87.
Declaration of Reza Abhari, In re U.S. Pat. No. 8,448,895, Executed Nov. 28, 2016, pp. 1-81.
Declaration of Reza Abhari. In re U.S. Pat. No. 8,695,920, claims 1-4, 7-14, 17 and 19, Executed Nov. 29, 2016, pp. 1-102.
Declaration of Reza Abhari. In re U.S. Pat. No. 8,695,920. Executed Nov. 30, 2016, pp. 1-67.
Declaration of Reza Abhari, Ph.D. In re U.S. Pat. No. 8,844,265, Executed Jun. 28, 2016, pp. 1-91.
Defeo, A. and Kulina, M. (1977). Quiet clean short-haul experimental engine (QCSEE) main reduction gears detailed design final report. Prepared for NASA. NASA-CR-134872. Jul. 1977. pp. 1-221.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Drago, R.J. (1974). Heavy-lift helicopter brings up drive ideas. Power Transmission Design. Mar. 1987. pp. 1-15.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Dudley, D.W., Ed. (1954). Handbook of practical gear design. Lancaster, PA: Technomic Publishing Company, Inc. pp. 3.96-3.102 and 8.12-8.18.
Dudley, D.W., Ed. (1962). Gear handbook. New York, NY: McGraw-Hill. pp. 14-17 (TOC, Preface, and Index).
Dudley, D.W., Ed. (1962). Gear handbook. New York, NY: McGraw-Hill. pp. 3.14-3.18 and 12.7-12.21.
Dudley, D.W., Ed. (1994). Practical gear design. New York, NY: McGraw-Hill. pp. 119-124.
Edkins, D.P., Hirschkron, R., and Lee, R. (1972). TF34 turbofan quiet engine study. Final Report prepared for NASA. NASA-CR-120914. Jan. 1, 1972. pp. 1-99.
Edwards, T. and Zabarnick, S. (1993). Supercritical fuel deposition mechanisms. Ind. Eng. Chem. Res. vol. 32. 1993. pp. 3117-3122.
El-Sayad, A.F. (2008). Aircraft propulsion and gas turbine engines. Boca Raton, FL: CRC Press, pp. 215-219 and 355-360.
Engine Alliance GP7200. Jane's Aero-Engines. Jane's by IHS Markit. Jul. 12, 2010.
European Search Report for Application No. EP161786668.6 dated Nov. 15, 2016, 10 pages.
European Search Report for European Application No. 16178668.6 dated Nov. 22, 2016.
European Search Report for European Application No. 16178679.3 dated Dec. 1, 2016.
European Search Report for European Application No. 16178691.8 dated Dec. 7, 2016.
European Search Report for European Patent Application No. 19184028.9 completed Oct. 10, 2019.
Faghri, A. (1995). Heat pipe and science technology. Washington, D.C.: Taylor & Francis. pp. 1-60.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
File History for U.S. Appl. No. 12/131,876.
Fisher, K., Berton, J., Guynn, M., Haller B., Thurman, D., and Tong, M. (2012). NASA's turbofan engine concept study for a next-generation single-aisle transport. Presentation to ICAO's noise technology independent expert panel. Jan. 25, 2012. pp. 1-23.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Garret TFE731 Turbofan Engine (CAT C). Chapter 79: Lubrciation System. TTFE731 Issue 2. 2010. pp. 1-24.
Gates, D. Bombardier flies at higher market. Seattle Times. Jul. 13, 2008. pp. C6.
General Electric F101. Janes's Aero-Engines. Jane's by IHS Markit. Oct. 11, 2012.
General Electric F101. Scramble—The Aviation Magazine. Oct. 24, 2011. Retrieved May 17, 2013 from: http://wiki.scramble.nl/index.php?title=General_Electric_F101#F101-GE-100.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A55, 1992. pp. 147-158.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Gliebe, P.R., Ho, P.Y., and Mani, R. (1995). UHB engine fan and broadband noise reduction study. NASA CR-198357. Jun. 1995. pp. 1-48.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Gray, D.E. (1978). Energy efficient engine preliminary design and integration studies. NASA-CP-2036-PT-1. Nov. 1978. pp. 89-110.
Gray, D.E. (1978). Energy efficient engine preliminary design and integration studies. Prepared for NASA. NASA CR-135396. Nov. 1978. pp. 1-366.
Gray, D.E. and Gardner, W.B. (1983). Energy efficient engine program technology benefit/cost study—vol. 2. NASA CR-174766. Oct. 1983. pp. 1-118.
2003 NASA seal/secondary air system workshop. (2003). NASA/CP-2004-212963/vol. 1. Sep. 1, 2004. pp. 1-408.
About GasTurb. Retrieved Jun. 26, 2018 from: http://gasturb.de/about-gasturb.html.
Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.
Aerospace Information Report. (2008). Advanced ducted propulsor in-flight thrust determination. SAE International AIR5450. Aug. 2008. p. 1-392.
Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.
Agma Standard (1997). Design and selection of components for enclosed gear drives, lexandria, VA: American Gear Manufacturers Association. pp. 1-48.
Agma Standard (1999). Flexible couplings—Mass elastic properties and other characteristics. Alexandria, VA: American Gear Manufacturers Association. pp. 1-46.
Agma Standard (2006). Design manual for enclosed epicyclic gear drives. Alexandria, VA: American Gear Manufacturers Association. pp. 1-104.
Ahmad, F. and Mizramoghadam, A.V. (1999). Single v. two stage high pressure turbine design of modem aero engines. ASME. Prestend at the International Gast Turbine & Aeroengine Congress & Exhibition. Indianapolis, Indiana. Jun. 7-10, 1999. pp. 1-9.

(56) References Cited

OTHER PUBLICATIONS

Amezketa, M., Iriarte, X., Ros, J., and Pintor, J. (2009). Dynamic model of a helical gear pair with backlash and angle-varying mesh stiffness. Multibody Dynamics 2009, ECCOMAS Thematic Conference. 2009. pp. 1-36.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Anderson, R.D. (1985). Advanced Propfan Engine Technology (APET) definition study, single and counter-rotation gearbox/pitch change mechanism design. NASA CR-168115. Jul. 1, 1985. pp. 1-289.
Applicant-Admitted Prior Art: Diagram "GE 90 Engine Airflow" http://ctr-sgi1.stanford.edu/CITS/ge90.html downloaded Jun. 15, 2012.
Applicant-Admitted Prior Art: Flight International, Avco Lycoming ALF502F-2 Cutaway, 2007, http://www.flightglobal.com/airspace/media/aeroenginesjetcutaways/avco-lycoming-alf502r-2-cutaway-5582.aspx.
Applicant-Admitted Prior Art: Flight International, Avco Lycoming LF507F Cutaway, 2007, http://www.flightglobal.com/airspace/media/aeroenginesjetcutaways/avco-lycoming-alf502r-2-cutaway-5582.aspx.
Applicant-Admitted Prior Art: Flight International, Avco Lycoming TFE531 Cutaway, 2007, http://www.flightglobal.com/airspace/media/aeroenginesjetcutaways/avco-lycoming-alf502r-2-cutaway-5582.aspx.
Applicant-admitted prior art: Garrett TFE 731-3 sectional view from http://perso.ovh.net/~caeaxtke/fr/coll/falcon50_5.html downloaded Jun. 15, 2012.
Applicant-Admitted Prior Art: Rolls Royce Trent 800, cutaway view, http://www.epower-propulsion.com/epower/gallery/ABP-RR%20Trent%20800%20cutaway.htm downloaded Jun. 15, 2012.
Applicant-admitted prior art: Rolls-Royce Trent 1000 cutaway view from http://hackedgadgets.com/2011/08/02/how-to-build-a-rolls-royce-trent-1000-jet-engine-used-in-the-boeing-787/ downloaded Jun. 15, 2012.
Applicant-Admitted Prior Art: Rolls-Royce Trent cutaway view from http://web.mit.edu/aeroastro/labs/gtl/early_GT_history.html downloaded Jun. 15, 2012.
Applicant-admitted prior art: Rolls-Royce Trent cutaway view from http://www.warandtactics.com/smf/planet-earth-the-serious-stuff-non-mil-news/a-380-emergency-landing!/ downloaded Jun. 15, 2012.
Applicant-Admitted Prior Art: TFE 731-20 PR Sheet, http://design.ae.utexas.edu/subject/work/TFE731_4.jpg downloaded Jun. 15, 2012.
Applicant-Admitted Prior Art: V2500 Fact Sheet, International Aero Engines, http://i-a-e.com/wp-content/uploads/2012/03/facts.pdf Jun. 15, 2012.
Avco Lycoming Divison. Alf 502L Maintenance Manual. Apr. 1981. pp. 1-118.
Aviadvigatel D-110. Jane's Aero-engines, Aero-engines—Turbofan. Jun. 1, 2010.
Awker, R.W. (1986). Evaluation of propfan propulsion applied to general aviation. NASA CR-175020. Mar. 1, 1986. pp. 1-140.
Baker, R.W. (2000). Membrane technology and applications. New York, NY: McGraw-Hill. pp. 87-153.
Berton, J.J. and Guynn, M.D. (2012). Multi-objective optimization of a turbofan for an advanced, single-aisle transport. NASA/TM-2012-217428. pp. 1-26.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Bloomer, H.E. and Loeffler, I.J. (1982). QCSEE over-the-wing engine acoustic data. NASA-TM-82708. May 1, 1982. pp. 1-558.
Bloomer, H.E. and Samanich, N.E. (1982). QCSEE under-the-wing engine acoustic data. NASA-TM-82691. May 1, 1982. pp. 1-28.
Bloomer, H.E. and Samanich, N.E. (1982). QCSEE under-the-wing enging-wing-flap aerodynamic profile characteristics. NASA-TM-82890 Sep. 1, 1982. pp. 1-48.
Bloomer, H.E., Loeffler, I.J., Kreim, W.J., and Coats, J.W. (1981). Comparison of NASA and contractor reslts from aeroacoustic tests of QCSEE OTW engine. NASA Technical Memorandum 81761. Apr. 1, 1981. pp. 1-30.
Bornstein, N. (1993). Oxidation of advanced intermetallic compounds. Journal de Physique IV, 1993, 03 (C9), pp. C9-C367-C9-C373.
Brennan, P.J. and Kroliczek, E.J. (1979). Heat pipe design handbook. Prepared for National Aeronautics and Space Administration by B & K Engineering, Inc. Jun. 1979. pp. 1-348.
Brines, G.L. (1990). The turbofan of tomorrow. Mechanical Engineering: The Journal of the American Society of Mechanical Engineers,108(8), 65-67.
Bucknell, R.L. (1973). Influence of fuels and lubricants on turbine engine design and performance, fuel and lubircant analyses. Final Technical Report, Mar. 1971-Mar. 1973. pp. 1-252.
Bunker, R.S. (2005). A review of shaped hole turbine film-cooling technology. Journal of Heat Transfer vol. 127. Apr. 2005. pp. 441-453.
Carney, K., Pereira, M. Revilock, and Matheny, P. (2003). Jet engine fan blade containment using two alternate geometries. 4th European LS-DYNA Users Conference. pp. 1-10.
Chapman J.W., et al., "Control Design for an Advanced Geared Turbofan Engine", AIAA Joint Propulsion Conference 2017, Jul. 10, 2017-Jul. 12, 2017, Atlanta, GA, pp. 1-12.
Cheryan, M. (1998). Ultrafiltration and microfiltration handbook. Lancaster, PA: Tecnomic Publishing Company, Inc. pp. 171-236.
Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.
Clarke, D.R. and Levi, C.G. (2003). Materials design for the next generation thermal barrier coatings. Annual. Rev. Mater. Res. vol. 33. 2003. pp. 383-417.
Cramoisi, G. Ed. (2012). Death in the Potomac: The crash of Air Florida Flight 90. Air Crash Investigations. Accident Report NTSB/AAR-82-8. p. 45-47.
Cusick, M. (1981). Avco Lycoming's ALF 502 high bypass fan engine. Society of Automotive Engineers, Inc. Business Aircraft Meeting & Exposition. Wichita, Kansas. Apr. 7-10, 1981. pp. 1-9.
Daggett, D.L., Brown, S.T., and Kawai, R.T. (2003). Ultra-efficient engine diameter study. NASA/CR-2003-212309. May 2003. pp. 1-52.
Dalton, III., W.N. (2003). Ultra high bypass ratio low noise engine study. NASA/CR-2003-212523. Nov. 2003. pp. 1-187.
Daly, M. Ed. (2008). Jane's Aero-Engine. Issue Twenty-three. Mar. 2008. p. 707-12.
Daly, M. Ed. (2010). Jane's Aero-Engine. Issue Twenty-seven. Mar. 2010. p. 633-636.
Damerau, J. (2014) What is the mesh stiffness of gears? Screen shot of query submitted by Vahid Dabbagh, answered by Dr. Jochan Damerau, Research General Managerat Bosch Corp., Japan. Retrieved from: https://www.researchgate.net/post/What_is_the_mesh_stiffness_of_gears.

\* cited by examiner

TURBINE SECTION OF GAS TURBINE ENGINE

CROSS-REFERENCE TO RELATED APPLICATION

The present application is a continuation of U.S. patent application Ser. No. 17/062,756 filed Oct. 5, 2020, which is a continuation of U.S. patent application Ser. No. 16/025,094 filed Jul. 2, 2018, which is a continuation of U.S. patent application Ser. No. 15/292,472, filed Oct. 13, 2016, which is a continuation of U.S. patent application Ser. No. 14/793,785, filed Jul. 8, 2015, which is a continuation-in-part of U.S. patent application Ser. No. 14/692,090, filed Apr. 21, 2015, which is a continuation of U.S. patent application Ser. No. 13/599,175, filed Aug. 30, 2012, which is a continuation of U.S. patent application Ser. No. 13/475,252, now U.S. Pat. No. 8,844,265, issued Sep. 30, 2014, filed May 18, 2012. U.S. patent application Ser. No. 13/475,252 is a continuation-in-part of U.S. patent application Ser. No. 11/832,107, filed Aug. 1, 2007, and claims the benefit of U.S. Patent Provisional Application No. 61/593,190, filed Jan. 31, 2012, and U.S. Provisional Application No. 61/498,516, filed Jun. 17, 2011.

BACKGROUND

The disclosure relates to turbofan engines. More particularly, the disclosure relates to low pressure turbine sections of turbofan engines which power the fans via a speed reduction mechanism.

There has been a trend toward increasing bypass ratio in gas turbine engines. This is discussed further below. There has generally been a correlation between certain characteristics of bypass and the diameter of the low pressure turbine section sections of turbofan engines.

SUMMARY

One aspect of the disclosure involves a turbofan engine having an engine case and a gaspath through the engine case. A fan has a circumferential array of fan blades. The engine further has a compressor in fluid communication with the fan, a combustor in fluid communication with the compressor, a turbine in fluid communication with the combustor, wherein the turbine includes a low pressure turbine section having 3 to 6 blade stages. A speed reduction mechanism couples the low pressure turbine section to the fan. A bypass area ratio is greater than about 6.0. A ratio of the total number of airfoils in the low pressure turbine section divided by the bypass area ratio is less than about 170, said low pressure turbine section airfoil count being the total number of blade airfoils and vane airfoils of the low pressure turbine section.

In additional or alternative embodiments of any of the foregoing embodiments, the bypass area ratio may be greater than about 8.0 or may be between about 8.0 and about 20.0.

In additional or alternative embodiments of any of the foregoing embodiments, a fan case may encircle the fan blades radially outboard of the engine case.

In additional or alternative embodiments of any of the foregoing embodiments, the compressor may comprise a low pressure compressor section and a high pressure compressor section.

In additional or alternative embodiments of any of the foregoing embodiments, the blades of the low pressure compressor section and low pressure turbine section may share a low shaft.

In additional or alternative embodiments of any of the foregoing embodiments, the high pressure compressor section and a high pressure turbine section of the turbine may share a high shaft.

In additional or alternative embodiments of any of the foregoing embodiments, there are no additional compressor or turbine sections.

In additional or alternative embodiments of any of the foregoing embodiments, the speed reduction mechanism may comprise an epicyclic transmission coupling the low speed shaft to a fan shaft to drive the fan with a speed reduction.

In additional or alternative embodiments of any of the foregoing embodiments, the low pressure turbine section may have an exemplary 2 to 6 blade stages or 2 to 3 blade stages.

In additional or alternative embodiments of any of the foregoing embodiments, a hub-to-tip ratio (Ri:Ro) of the low pressure turbine section may be between about 0.4 and about 0.5 measured at the maximum Ro axial location in the low pressure turbine section.

In additional or alternative embodiments of any of the foregoing embodiments, a ratio of maximum gaspath radius along the low pressure turbine section to maximum radius of the fan may be less than about 0.55, or less than about 0.50, or between about 0.35 and about 0.50.

In additional or alternative embodiments of any of the foregoing embodiments, the ratio of low pressure turbine section airfoil count to bypass area ratio may be between about 10 and about 150.

In additional or alternative embodiments of any of the foregoing embodiments, the airfoil count of the low pressure turbine section may be below about 1600.

In additional or alternative embodiments of any of the foregoing embodiments, the engine may be in combination with a mounting arrangement (e.g., of an engine pylon) wherein an aft mount reacts at least a thrust load.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
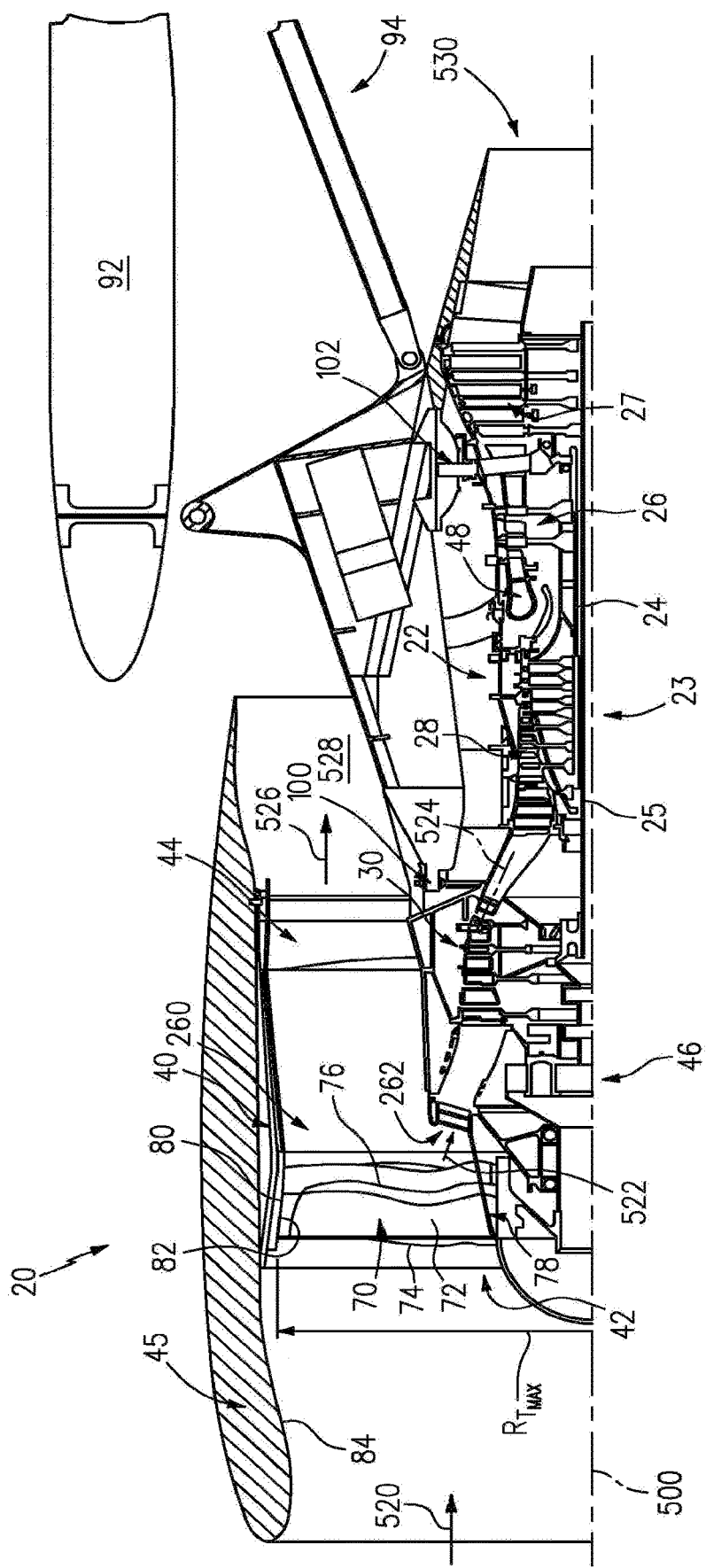
FIG. 1 is an axial sectional view of a turbofan engine.

FIG. 1 shows a turbofan engine 20 having a main housing (engine case) 22 containing a rotor shaft assembly 23. An exemplary engine is a high-bypass turbofan. In such an engine, the normal cruise condition bypass area ratio of air mass flowing outside the case 22 (e.g., the compressor sections and combustor) to air mass passing through the case 22 is typically in excess of about 4.0 and, more narrowly, typically between about 4.0 and about 12.0. Via high 24 and low 25 shaft portions of the shaft assembly 23, a high pressure turbine section (gas generating turbine) 26 and a low pressure turbine section 27 respectively drive a high pressure compressor section 28 and a low pressure compressor section 30. As used herein, the high pressure turbine section experiences higher pressures that the low pressure turbine section. A low pressure turbine section is a section that powers a fan 42. Although a two-spool (plus fan) engine is shown, one of many alternative variations involves a three-spool (plus fan) engine wherein an intermediate spool comprises an intermediate pressure compressor between the low fan and high pressure compressor section and an intermediate pressure turbine between the high pressure turbine section and low pressure turbine section.

The engine extends along a longitudinal axis 500 from a fore end to an aft end. Adjacent the fore end, a shroud (fan case) 40 encircles the fan 42 and is supported by vanes 44. An aerodynamic nacelle around the fan case is shown and an aerodynamic nacelle 45 around the engine case is shown.

The low shaft portion 25 of the rotor shaft assembly 23 drives the fan 42 through a speed reduction mechanism 46. An exemplary speed reduction mechanism is an epicyclic transmission, namely a star or planetary gear system. As is discussed further below, an inlet airflow 520 entering the nacelle is divided into a portion 522 passing along a core flowpath 524 and a bypass portion 526 passing along a bypass flowpath 528. With the exception of diversions such as cooling air, etc., flow along the core flowpath sequentially passes through the low pressure compressor section, high pressure compressor section, a combustor 48, the high pressure turbine section, and the low pressure turbine section before exiting from an outlet 530.

Figure 3:
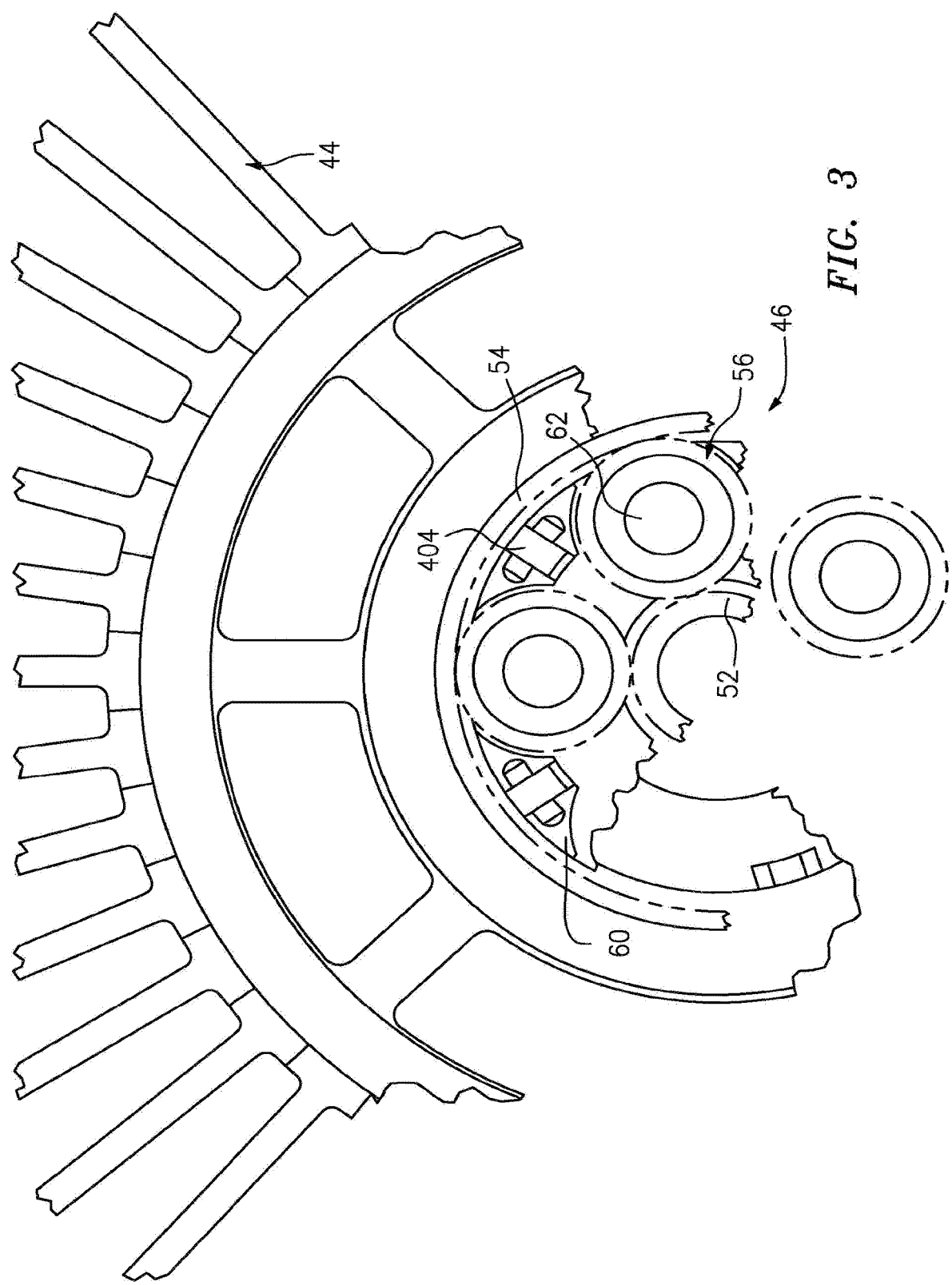
FIG. 3 is transverse sectional view of transmission of the engine of FIG. 1.

FIG. 3 schematically shows details of the transmission 46. A forward end of the low shaft 25 is coupled to a sun gear 52 (or other high speed input to the speed reduction mechanism). The externally-toothed sun gear 52 is encircled by a number of externally-toothed star gears 56 and an internally-toothed ring gear 54. The exemplary ring gear is coupled to the fan to rotate with the fan as a unit.

The star gears 56 are positioned between and enmeshed with the sun gear and ring gear. A cage or star carrier assembly 60 carries the star gears via associated journals 62. The exemplary star carrier is substantially irrotatably mounted relative via fingers 404 to the case 22.

Another transmission/gearbox combination has the star carrier connected to the fan and the ring is fixed to the fixed structure (case) is possible and such is commonly referred to as a planetary gearbox.

The speed reduction ratio is determined by the ratio of diameters within the gearbox. An exemplary reduction is between about 2:1 and about 13:1.

The exemplary fan (FIG. 1) comprises a circumferential array of blades 70. Each blade comprises an airfoil 72 having a leading edge 74 and a trailing edge 76 and extending from an inboard end 78 at a platform to an outboard end 80 (i.e., a free tip). The outboard end 80 is in close facing proximity to a rub strip 82 along an interior surface 84 of the nacelle and fan case.

To mount the engine to the aircraft wing 92, a pylon 94 is mounted to the fan case and/or to the other engine cases. The exemplary pylon 94 may be as disclosed in U.S. patent application Ser. No. 11/832,107 (US2009/0056343A1). The pylon comprises a forward mount 100 and an aft/rear mount 102. The forward mount may engage the engine intermediate case (IMC) and the aft mount may engage the engine thrust case. The aft mount reacts at least a thrust load of the engine.

To reduce aircraft fuel burn with turbofans, it is desirable to produce a low pressure turbine with the highest efficiency and lowest weight possible. Further, there are considerations of small size (especially radial size) that benefit the aerodynamic shape of the engine cowling and allow room for packaging engine subsystems.

Figure 2:
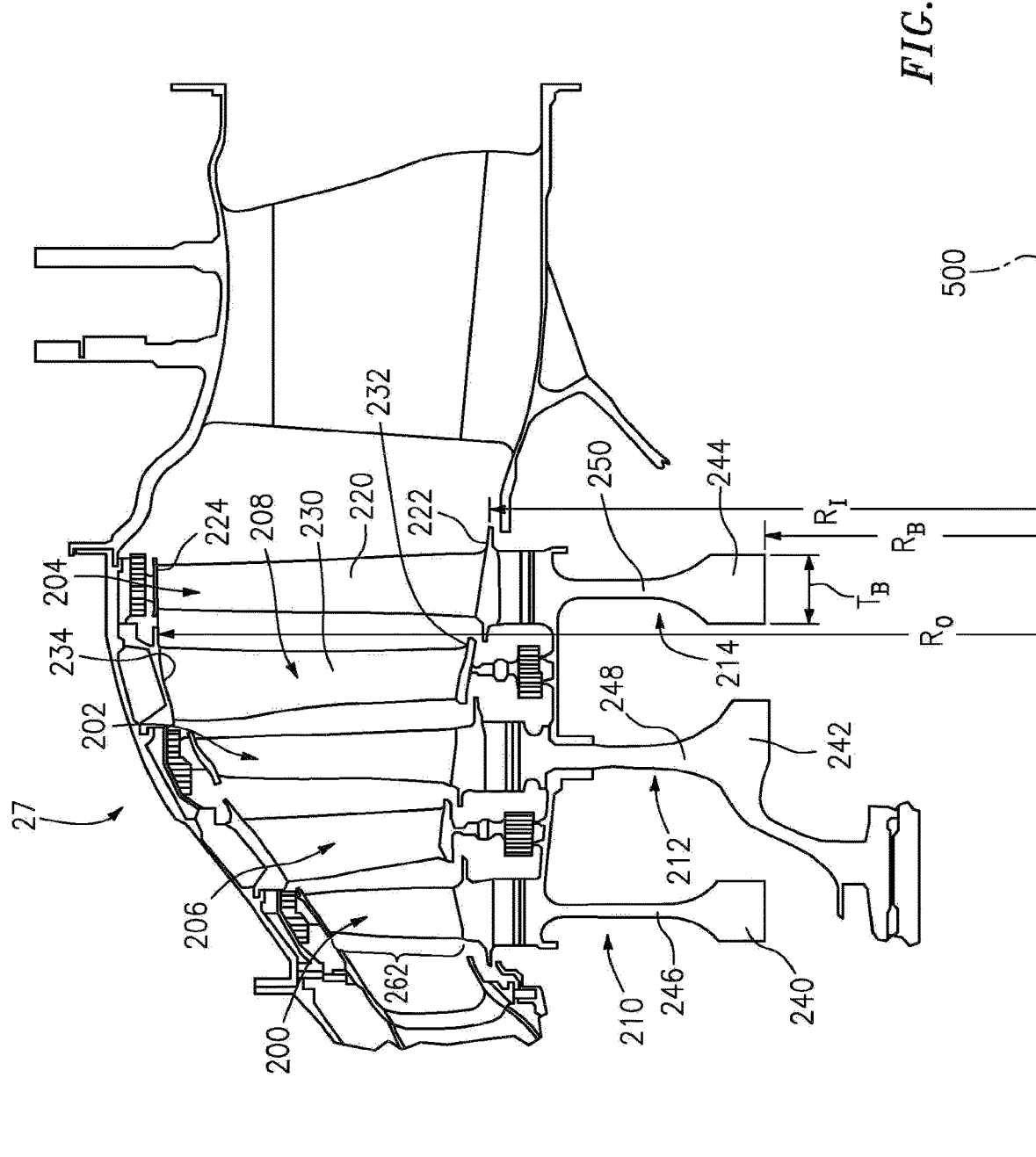
FIG. 2 is an axial sectional view of a low pressure turbine section of the engine of FIG. 1.

FIG. 2 shows the low pressure turbine section 27 as comprising an exemplary three blade stages 200, 202, 204. An exemplary blade stage count is 2-6, more narrowly, 2-4, or 2-3, 3-5, or 3-4. Interspersed between the blade stages are vane stages 206 and 208. Each exemplary blade stage comprises a disk 210, 212, and 214, respectively. A circumferential array of blades extends from peripheries of each of the disks. Each exemplary blade comprises an airfoil 220 extending from an inner diameter (ID) platform 222 to an outer diameter (OD) shroud 224 (shown integral with the airfoil An alternative may be an unshrouded blade with a rotational gap between the tip of the blade and a stationary blade outer air seal (BOAS). Each exemplary shroud 224 has outboard sealing ridges which seal with abradable seals (e.g., honeycomb) fixed to the case. The exemplary vanes in stages 206 and 208 include airfoils 230 extending from ID platforms 232 to OD shrouds 234. The exemplary OD shrouds 234 are directly mounted to the case. The exemplary platforms 232 carry seals for sealing with inter-disk knife edges protruding outwardly from inter-disk spacers which may be separate from the adjacent disks or unitarily formed with one of the adjacent disks.

Each exemplary disk 210, 212, 214 comprises an enlarged central annular protuberance or "bore" 240, 242, 244 and a thinner radial web 246, 248, 250 extending radially outboard from the bore. The bore imparts structural strength allowing the disk to withstand centrifugal loading which the disk would otherwise be unable to withstand.

A turbofan engine is characterized by its bypass ratio (mass flow ratio of air bypassing the core to air passing through the core) and the geometric bypass area ratio (ratio of fan duct annulus area outside/outboard of the low pressure compressor section inlet (i.e., at location 260 in FIG. 1) to low pressure compressor section inlet annulus area (i.e., at location 262 in FIG. 2). High bypass engines typically have bypass area ratio of at least four. There has been a correlation between increased bypass area ratio and increased low pressure turbine section radius and low pressure turbine section airfoil count. As is discussed below, this correlation may be broken by having an engine with relatively high bypass area ratio and relatively low turbine size.

By employing a speed reduction mechanism (e.g., a transmission) to allow the low pressure turbine section to turn very fast relative to the fan and by employing low pressure turbine section design features for high speed, it is possible to create a compact turbine module (e.g., while producing the same amount of thrust and increasing bypass area ratio). The exemplary transmission is a epicyclic transmission. Alternative transmissions include composite belt transmissions, metal chain belt transmissions, fluidic transmissions, and electric means (e.g., a motor/generator set where the turbine turns a generator providing electricity to an electric motor which drives the fan).

Compactness of the turbine is characterized in several ways. Along the compressor and turbine sections, the core gaspath extends from an inboard boundary (e.g., at blade hubs or outboard surfaces of platforms of associated blades and vanes) to an outboard boundary (e.g., at blade tips and inboard surfaces of blade outer air seals for unshrouded blade tips and at inboard surfaces of OD shrouds of shrouded blade tips and at inboard surfaces of OD shrouds of the vanes). These boundaries may be characterized by radii $R_I$ and $R_O$, respectively, which vary along the length of the engine.

For low pressure turbine radial compactness, there may be a relatively high ratio of radial span ($R_O$-$R_I$) to radius ($R_O$ or $R_I$). Radial compactness may also be expressed in the hub-to-tip ratio ($R_I$:$R_O$). These may be measured at the maximum $R_O$ location in the low pressure turbine section. The exemplary compact low pressure turbine section has a hub-to-tip ratio close to about 0.5 (e.g., about 0.4-0.5 or about 0.42-0.48, with an exemplary about 0.46).

Another characteristic of low pressure turbine radial compactness is relative to the fan size. An exemplary fan size measurement is the maximum tip radius $R_{Tmax}$ of the fan blades. An exemplary ratio is the maximum $R_O$ along the low pressure turbine section to $R_{Tmax}$ of the fan blades. Exemplary values for this ratio are less than about 0.55 (e.g., about 0.35-55), more narrowly, less than about 0.50, or about 0.35-0.50.

To achieve compactness the designer may balance multiple physical phenomena to arrive at a system solution as defined by the low pressure turbine hub-to-tip ratio, the fan maximum tip radius to low pressure turbine maximum $R_O$ ratio, the bypass area ratio, and the bypass area ratio to low pressure turbine airfoil count ratio. These concerns include, but are not limited to: a) aerodynamics within the low pressure turbine, b) low pressure turbine blade structural design, c) low pressure turbine disk structural design, and d) the shaft connecting the low pressure turbine to the low pressure compressor and speed reduction device between the low pressure compressor and fan. These physical phenomena may be balanced in order to achieve desirable performance, weight, and cost characteristics.

The addition of a speed reduction device between the fan and the low pressure compressor creates a larger design space because the speed of the low pressure turbine is decoupled from the fan. This design space provides great design variables and new constraints that limit feasibility of a design with respect to physical phenomena. For example the designer can independently change the speed and flow area of the low pressure turbine to achieve optimal aerodynamic parameters defined by flow coefficient (axial flow velocity/wheel speed) and work coefficient (wheel speed/ square root of work). However, this introduces structural constraints with respect blade stresses, disk size, material selection, etc.

In some examples, the designer can choose to make low pressure turbine section disk bores much thicker relative to prior art turbine bores and the bores may be at a much smaller radius $R_B$. This increases the amount of mass at less than a "self sustaining radius". Another means is to choose disk materials of greater strength than prior art such as the use of wrought powdered metal disks to allow for extremely high centrifugal blade pulls associated with the compactness.

Another variable in achieving compactness is to increase the structural parameter $AN^2$ which is the annulus area of the exit of the low pressure turbine divided by the low pressure turbine rpm squared at its redline or maximum speed. Relative to prior art turbines, which are greatly constrained by fan blade tip mach number, a very wide range of $AN^2$ values can be selected and optimized while accommodating such constraints as cost or a countering, unfavorable trend in low pressure turbine section shaft dynamics. In selecting the turbine speed (and thereby selecting the transmission speed ratio, one has to be mindful that at too high a gear ratio the low pressure turbine section shaft (low shaft) will become dynamically unstable.

The higher the design speed, the higher the gear ratio will be and the more massive the disks will become and the stronger the low pressure turbine section disk and blade material will have to be. All of these parameters can be varied simultaneously to change the weight of the turbine, its efficiency, its manufacturing cost, the degree of difficulty in packaging the low pressure turbine section in the core cowling and its durability. This is distinguished from a prior art direct drive configuration, where the high bypass area ratio can only be achieved by a large low pressure turbine section radius. Because that radius is so very large and, although the same variables (airfoil turning, disk size, blade materials, disk shape and materials, etc.) are theoretically available, as a practical matter economics and engine fuel burn considerations severely limit the designer's choice in these parameters.

Another characteristic of low pressure turbine section size is airfoil count (numerical count of all of the blades and vanes in the low pressure turbine). Airfoil metal angles can be selected such that airfoil count is low or extremely low relative to a direct drive turbine. In known prior art engines having bypass area ratio above 6.0 (e.g. 8.0-20), low pressure turbine sections involve ratios of airfoil count to bypass area ratio above 190.

With the full range of selection of parameters discussed above including, disk bore thickness, disk material, hub to tip ratio, and $R_O/R_{Tmax}$, the ratio of airfoil count to bypass area ratio may be below about 170 to as low as 10. (e.g., below about 150 or an exemplary about 10-170, more narrowly about 10-150). Further, in such embodiments the airfoil count may be below about 1700, or below about 1600.

Figure 4:
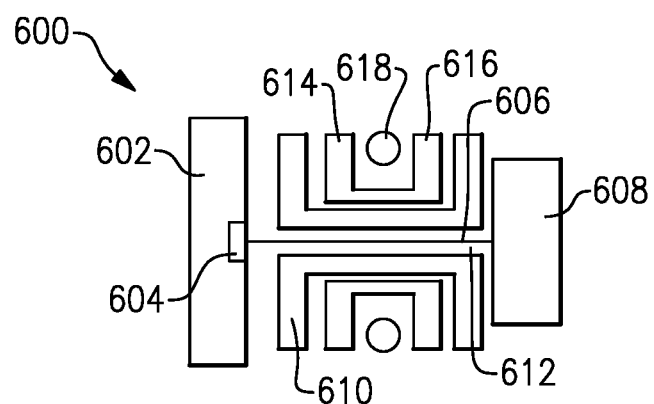
FIG. 4 shows another embodiment.

FIG. 4 shows an embodiment 600, wherein there is a fan drive turbine 608 driving a shaft 606 to in turn drive a fan rotor 602. A gear reduction 604 may be positioned between the fan drive turbine 608 and the fan rotor 602. This gear reduction 604 may be structured and operate like the gear reduction disclosed above. A compressor rotor 610 is driven by an intermediate pressure turbine 612, and a second stage compressor rotor 614 is driven by a turbine rotor 216. A combustion section 618 is positioned intermediate the compressor rotor 614 and the turbine section 616.

Figure 5:
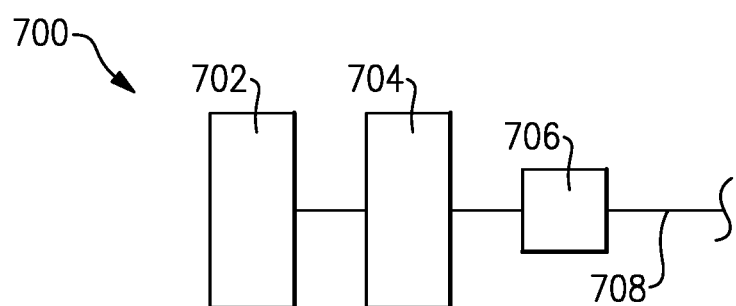
FIG. 5 shows yet another embodiment.

FIG. 5 shows yet another embodiment 700 wherein a fan rotor 702 and a first stage compressor 704 rotate at a common speed. The gear reduction 706 (which may be structured as disclosed above) is intermediate the compressor rotor 704 and a shaft 708 which is driven by a low pressure turbine section.

One or more embodiments have been described. Nevertheless, it will be understood that various modifications may be made. For example, when reengineering from a baseline engine configuration, details of the baseline may influence details of any particular implementation. Accordingly, other embodiments are within the scope of the following claims.

What is claimed is:

1. A gas turbine engine comprising:
a propulsor including a circumferential array of blades;
a compressor in fluid communication with the propulsor, the compressor including a high pressure compressor section and a low pressure compressor section, and the low pressure compressor section including a low pressure compressor section inlet with a low pressure compressor section inlet annulus area;
a combustor in fluid communication with the compressor;

a shaft assembly having a first portion and a second portion;

a two-stage high pressure turbine section coupled to the first portion of the shaft assembly to drive the high pressure compressor section, and a low pressure turbine section coupled to the second portion of the shaft assembly, each of the high pressure turbine section and low pressure turbine section including blades and vanes, and a low pressure turbine section airfoil count defined as the numerical count of all of the blades and vanes in the low pressure turbine section, wherein the low pressure turbine section airfoil count is below 1600, wherein the low pressure compressor section includes a greater number of stages than the high pressure turbine section, and the low pressure compressor section and the low pressure turbine section have an equal number of stages;

a speed reduction mechanism coupled to the propulsor and rotatable by the low pressure turbine section through the second portion of the shaft assembly to drive the propulsor; and wherein the low pressure turbine section further includes a maximum gas path radius, the blades of the propulsor include a maximum radius, and a ratio of the maximum gas path radius to the maximum radius of the blades of the propulsor is equal to or greater than 0.35, and is less than 0.55.

2. The engine as recited in claim 1, wherein a total number of stages of the high pressure compressor section is greater than a combined total number of stages of the low pressure compressor section and the low pressure turbine section.

3. The engine as recited in claim 2, wherein a hub-to-tip ratio (RI:RO) of the low pressure turbine section is between 0.4 and 0.5 measured at the maximum RO axial location in the low pressure turbine section.

4. The engine as recited in claim 3, wherein the speed reduction mechanism is an epicyclic transmission including a sun gear encircled by a plurality of intermediary gears, a ring gear and a carrier that carries the plurality of intermediate gears, wherein the intermediary gears are positioned between and enmeshed with the sun gear and the ring gear.

5. The engine as recited in claim 4, wherein the epicyclic transmission has a speed reduction ratio between 2:1 and 13:1 determined by the ratio of diameters within the epicyclic transmission.

6. The engine as recited in claim 5, wherein the ratio of the maximum gas path radius to the maximum radius of the array of blades of the propulsor is less than 0.50, and the hub-to-tip ratio (RI:RO) is between 0.42 and 0.48.

7. The engine as recited in claim 5, wherein the epicyclic transmission is a star gear system, the sun gear is coupled to a forward end of the second portion of the shaft assembly, the carrier is mounted to an engine case, and the ring gear is coupled to the propulsor such that the ring gear and the propulsor are rotatable as a unit.

8. The engine as recited in claim 5, wherein the epicyclic transmission is a planetary gear system, the sun gear is coupled to a forward end of the second portion of the shaft assembly, the carrier is connected to the propulsor, and the ring gear is fixed to a fixed structure of the engine.

9. The engine as recited in claim 8, wherein the low pressure turbine section drives the low pressure compressor section and an input of the epicyclic transmission.

10. The engine as recited in claim 9, wherein the epicyclic transmission is axially aft of the low pressure compressor section inlet annulus area with respect to a longitudinal axis of the engine.

11. The engine as recited in claim 10, wherein the engine is a two-spool engine, the propulsor is a fan, and further comprising a fan case encircling the array of blades radially outboard of an engine case to define a fan duct and a bypass flow path, and the fan duct including a fan duct annulus area outboard of the low pressure compressor section inlet, and the engine having only a single fan stage comprising the array of blades.

12. The engine as recited in claim 11, wherein the ratio of the maximum gas path radius to the maximum radius of the array of blades of the fan is less than 0.50.

13. The engine as recited in claim 12, wherein the hub-to-tip ratio (RI:RO) is between 0.42 and 0.48.

14. The engine as recited in claim 13, wherein each of the blades of the low pressure turbine section is an unshrouded blade.

15. The engine as recited in claim 13, wherein each of the blades of the low pressure turbine section includes an airfoil extending from an inner diameter platform to an outer diameter shroud.

16. The engine as recited in claim 13, wherein the low pressure turbine section is a four-stage turbine section.

17. A gas turbine engine comprising:

a propulsor including a circumferential array of blades;

a compressor in fluid communication with the propulsor, the compressor including a nine-stage high pressure compressor section and a low pressure compressor section, the low pressure compressor section including a low pressure compressor section inlet with a low pressure compressor section inlet annulus area, and the low pressure compressor section including four stages;

a combustor in fluid communication with the compressor;

a shaft assembly having a first portion and a second portion;

a two-stage high pressure turbine section coupled to the first portion of the shaft assembly to drive the high pressure compressor section, and a four-stage low pressure turbine section coupled to the second portion of the shaft assembly, each of the high pressure turbine section and low pressure turbine section including blades and vanes, and a low pressure turbine section airfoil count defined as the numerical count of all of the blades and vanes in the low pressure turbine section, and wherein the low pressure turbine section airfoil count is below 1600; and a speed reduction mechanism coupled to the propulsor and rotatable by the low pressure turbine section through the second portion of the shaft assembly to drive the propulsor; and wherein the low pressure turbine section further includes a maximum gas path radius, the blades of the propulsor include a maximum radius, and a ratio of the maximum gas path radius to the maximum radius of the blades of the propulsor is equal to or greater than 0.35, and is less than 0.55.

18. The engine as recited in claim 17, wherein a hub-to-tip ratio (RI:RO) of the low pressure turbine section is between 0.4 and 0.5 measured at the maximum RO axial location in the low pressure turbine section.

19. The engine as recited in claim 18, wherein the speed reduction mechanism is an epicyclic transmission including a sun gear encircled by a plurality of intermediary gears, a ring gear and a carrier that carries the plurality of intermediate gears, wherein the intermediary gears are positioned between and enmeshed with the sun gear and the ring gear.

20. The engine as recited in claim 19, wherein the epicyclic transmission has a speed reduction ratio between 2:1 and 13:1 determined by the ratio of diameters within the epicyclic transmission.

21. The engine as recited in claim 20, wherein the ratio of the maximum gas path radius to the maximum radius of the array of blades of the propulsor is less than 0.50, and the hub-to-tip ratio (RI:RO) is between 0.42 and 0.48.

22. The engine as recited in claim 20, wherein the epicyclic transmission is a star gear system, the sun gear is coupled to a forward end of the second portion of the shaft assembly, the carrier is mounted to an engine case, and the ring gear is coupled to the propulsor such that the ring gear and the propulsor are rotatable as a unit.

23. The engine as recited in claim 20, wherein the epicyclic transmission is a planetary gear system, the sun gear is coupled to a forward end of the second portion of the shaft assembly, the carrier is connected to the propulsor, and the ring gear is fixed to a fixed structure of the engine.

24. The engine as recited in claim 23, wherein the low pressure turbine section drives the low pressure compressor section and an input of the epicyclic transmission.

25. The engine as recited in claim 24, wherein the epicyclic transmission is axially aft of the low pressure compressor section inlet annulus area with respect to a longitudinal axis of the engine.

26. The engine as recited in claim 25, wherein the engine is a two-spool engine, the propulsor is a fan, and further comprising a fan case encircling the array of blades radially outboard of an engine case to define a fan duct and a bypass flow path, and the fan duct including a fan duct annulus area outboard of the low pressure compressor section inlet, and the engine having only a single fan stage comprising the array of blades.

27. The engine as recited in claim 26, wherein the ratio of the maximum gas path radius to the maximum radius of the array of blades of the fan is less than 0.50.

28. The engine as recited in claim 27, wherein the hub-to-tip ratio (RI:RO) is between 0.42 and 0.48.

29. The engine as recited in claim 28, wherein each of the blades of the low pressure turbine section is an unshrouded blade.

30. The engine as recited in claim 28, wherein each of the blades of the low pressure turbine section includes an airfoil extending from an inner diameter platform to an outer diameter shroud.

* * * * *